Patented Sept. 18, 1945

2,385,182

UNITED STATES PATENT OFFICE 2,385,182

MANUFACTURE AND APPLICATION OF SYNTHETIC RUBBERLIKE MATERIALS

James Gordon Anderson, Trowbridge, and Rowland Hill and Leslie Budworth Morgan, Manchester, England, assignors to Imperial Chemical Industries Limited, a corporation of Great Britain No Drawing. Application May 18, 1939, Serial No. 274,432. In Great Britain May 18, 1938

10 Claims. (Cl. 260—84.5)

This invention relates to improvements in the manufacture and application of synthetic rubber-like materials.

According to the invention we manufacture synthetic rubber-like materials by polymerisation of a mixture of butadiene-1:3 or a 2-chlorobutadiene-1:3 or a methyl or dimethyl derivative of either and a saponifiable derivative of α-chloroacrylic acid.

Also according to the invention we vulcanise the polymerised products obtained by the above process by subjecting them to a heat treatment in the presence of compounding ingredients.

By saponifiable derivatives of α-chloroacrylic acid we mean esters, amides, substituted amides and the nitrile of α-chloroacrylic acid. By the term esters we mean alkyl esters, e. g., methyl, ethyl, n-butyl and cetyl esters, also aralkyl esters, e. g., benzyl ester, also aryl esters, e. g., the phenyl ester, also alkoxyalkyl esters, e. g., the β-ethoxyethyl ester, also aryloxyalkyl esters, e. g. the β-phenoxy ester, also chloroalkyl esters, e. g., the β-chloroethyl ester. As derivatives of amides we mean alkyl and aryl amides, e. g., the anilide. The esters may be made from α-chloroacrylic acid by known methods of esterification. The amide and substituted amides may be made from α-chloroacrylic acid by known methods of making acid amides and substituted acid amides, for instance, by interacting a carboxylic acid chloride with an amine. α-Chloroacrylonitrile is made by chlorinating acrylonitrile to αβ-dichloroacrylonitrile, which is a new compound, and then treating this with dimethylaniline so as to remove hydrogen chloride.

The proportions in which the materials to be polymerised are to be used depend upon the individual compounds chosen, but it is desirable to use a larger proportion of what may be called the butadiene component than of what may be called the chloroacrylic component, particularly when the product is to be subjected subsequently to vulcanisation.

As the proportion of chloroacrylic component is increased, the oil and solvent resistance of the resulting vulcanisate becomes progressively better. On the other hand, rubber-like qualities such as tensile strength, elongation at break, and resilience, may for example as in the case of butadiene and methyl α-chloroacrylate reach a peak when the proportion of the latter is between 25% and 40% of the whole. However, the rubber-like qualities are in turn conditioned by the methods of vulcanisation, addition of plasticizers, softeners and the like, so that it is possible to obtain useful products when the proportion of methyl α-chloroacrylate present, substantially exceeds the amount already stated. When the proportion present is about 60%–70%, the products obtained still retain in the unvulcanised condition, some elastic rubber-like qualities, and are of value on account of their great resistance to the swelling action of oils and solvents.

When polymerisation is effected in aqueous emulsion, emulsification is preferably carried out in the presence of an emulsifying agent. Sodium isopropylnaphthalene sulphonate, cetyltrimethylammonium bromide, cetyl p-dimethylaminobenzoate methosulphate, sodium cetyl sulphate and other salts derived from long chain bases and inorganic or organic acids are suitable emulsifying agents. The operation is preferably conducted under slightly acidic conditions, for example at a hydrogen ion concentration of 3 or thereabouts. Thus, small proportions of suitable electrolytes e. g., acetic acid, or acetic acid admixed with sodium acetate may be conveniently included in the mixture. The products of polymerisation are produced in latex-like form. They may be obtained in massive form by coagulating the latex, separating the coagulum, washing and drying. The coagulation may be effected by known methods e. g., by freezing or by the addition of sodium chloride, sodium hydroxide or ethyl alcohol depending upon the emulsifying agent which has been employed. Washing and drying may be effected by convenient means as on heated rollers i. e., a rubber roller mill which is furnished with a device for washing e. g., a water spray.

When polymerisation is being effected between 2-chlorobutadiene-1:3 or homologues thereof as previously defined and a derivative of α-chloroacrylic acid, it is desirable only to maintain a comparatively low temperature e. g., 10°–40° C. in order that polymerisation shall proceed rapidly and efficiently. On account of the ease and efficiency with which polymerisation occurs, it is generally not necessary to introduce polymerisation catalysts. However the use of such known organic and inorganic peroxides and persalts as benzoyl peroxide, peracetic acid, and ammonium persulphate are not excluded from the process. Agents which are known to modify the course of the polymerisation of 2-chlorobutadiene-1:3 in aqueous emulsion may be present during the operation. Such agents include inter alia hydrogen sulphide, sulphur dioxide (see British Specification 497,420), mercapto and mercaptocarboxylic acids e. g., thiophenol, thiocresols, thionaphthols, benzylmercaptan, octylmercaptan and thioglycollic acid (see British Specifications Nos. 497,638 and 497,706). They may with advantage be employed in small amount for improving the plasticity of the polymerisation products.

When butadiene or its homologues are polymerised with α-chloroacrylic derivatives, it is generally desirable to conduct the operation at a temperature above that used for 2-chlorobutadiene-1:3 and its homologues and to continue the operation for a longer period. Catalysts and agents known to modify the course of the polymerisation of butadiene may with advantage be included in the polymerisation mixture. Suitable modifying agents are simple chlorine containing aliphatic compounds in which the chlorine is directly attached to carbon, for example, carbon tetrachloride.

Polymerisation may also be conducted in mass form by mixing together the components and heating, preferably with a polymerisation catalyst such as an inorganic or organic peroxide.

The dry rubber-like material may be converted to products more nearly resembling vulcanised natural rubber by compounding and vulcanising. Compounding may be effected with, for example, filling and reinforcing ingredients such as carbon black and zinc oxide. Curing may be effected by subjecting the material to a heat treatment, if desired in the presence of sulphur and with natural rubber vulcanisation accelerators. The vulcanisates produced according to the present invention are better than vulcanisates from natural rubber in their resistance to lubricating oils and hydrocarbon solvents.

Compared with vulcanisates from 2-chlorobutadiene-1:3 polymer and butadiene polymer the corresponding products made according to the present invention show improved resistance to oils and solvents.

The following examples in which parts are by weight, illustrate but do not limit the invention.

Example 1

400 parts of water, 4 parts of cetyl p-dimethylaminobenzoate methosulphate, 22 parts of 6% acetic acid, 30 parts of methyl α-chloroacrylate and 60 parts of butadiene-1:3 are enclosed in a stainless steel autoclave which is shaken and kept at 60° C. for 5 days. A latex is obtained. This is coagulated by adding to it 100 parts of aqueous sodium hydroxide solution, and then warming the resulting mixture to about 40° C. After washing with water on rubber roller mills and drying by heating the rolls, a good yield of a tough rubber-like material is obtained.

Example 2

400 parts of water, 4 parts of cetyl p-dimethylaminobenzoate. methosulphate, 22 parts of 6% acetic acid, 10 parts of carbon tetrachloride, 30 parts of α-chloroacrylonitrile and 60 parts of butadiene-1:3 are subjected to the same polymerisation conditions as those described in Example 1. After 5 days, the latex is coagulated and the coagulum washed and dried as before. A good yield of a tough rubber-like material is obtained.

Example 3

400 parts of water, 4 parts of cetyl p-dimethylaminobenzoate methosulphate, 22 parts of 6% acetic acid, 10 parts of carbon tetrachloride, 60 parts of methyl α-chloroacrylate and 90 parts of butadiene-1:3 are subjected to the same polymerisation conditions as those of Example 1, the resulting latex is also treated as before. A good yield of a rubber-like material is obtained. This is more resistant to oils than good quality natural rubber.

Example 4

The rubber-like material obtained according to Example 3 is included in the following mixing:

|  | Parts |
|---|---|
| Rubber-like material | 100 |
| Gas black | 50 |
| Stearic acid | 2 |
| Sulphur | 2 |
| Mercaptobenzthiazole | 1 |
| Zinc oxide | 10 |

The mix is cured for 60 minutes at 141° C. A vulcanisate is obtained which has a maximum tensile strength of 196 kg./cm.$^2$ and an elongation at break of 303%.

Example 5

80 parts of 2-chlorobutadiene-1:3 and 20 parts of methyl α-chloroacrylate are emulsified in 400 parts of a 3.8% aqueous solution of sodium cetyl sulphate at 10–15° C. To the emulsion there are added immediately 1.4 parts of sodium thioglycollate, 1.2 parts of a 30% aqueous solution of sodium hydrosulphide and 1 part of hydrochloric acid (sp. gr. 1.17). The temperature rises slowly to 40° C. and is then kept at this temperature by cooling until the initial vigour subsides, which requires about 15 minutes. After 2 hours at 40° C. the emulsion is coagulated by pouring it into saturated aqueous sodium chloride solution, the coagulum is washed with water on rubber rolls and dried. 95 parts of a rubber-like material are thereby obtained. This material can be readily worked on the mill.

Example 6

Into a closed vessel fitted with a water-cooled condenser, and high speed stirrer there are charged 477 parts of a 15% aqueous paste of sodium cetyl sulphate and 1800 parts of water. A mixture of 360 parts of 2-chlorobutadiene-1:3 and 90 parts methyl α-chloroacrylate is then added, the whole stirred vigorously. Polymerisation commences almost immediately and in order to maintain a temperature of 20° C. external cooling is applied. After about one hour, the exothermic reaction subsides. Polymerisation is substantially complete after 5–6 hours. A benzene solution containing 2.25 parts of phenyl β-naphthylamine is then added, the emulsion stirred again vigorously for a short time and the polymer coagulated by brine. The rubbery coagulum is washed with water on a rubber roller mill and dried, whereby 423 parts of a rubber-like product are obtained.

Example 7

The product of Example 6 is compounded to the following formula:

|  | Parts |
|---|---|
| Rubber-like material | 100 |
| Light calcined magnesia | 10 |
| Wood rosin | 5 |
| Antioxidant (condensation product of acetaldehyde and α and β-naphthylamines) | 2 |
| Cotton seed oil | 5 |
| Channel black | 35 |
| Sulphur | 1 |
| Zinc oxide | 10 |

The mix is cured for 1 hour at 141° C.
Comparison with a 2-chlorobutadiene polymer similarly compounded and vulcanised, shows the following results:

| Test | 2-chlorobutadiene-1:3 polymer | Product of Example 6 |
|---|---|---|
| Shore hardness | 61 | 70 |
| Shore elasticity | 86 | 85 |
| Tensile strength, kg./cm.² | 210 | 220 |
| Elongation at break, per cent | 580 | 400 |
| Permanent set | 8 | 4 |
| Resilience | 64.2 | 57.4 |
| Swelling in petrol | 91 | 52 |
| Swelling in Diesel oil | 53 | 24 |
| Swelling in transformer oil | 12.5 | 4 |

In evaluating the above vulcanisates the following methods were used:

(1) Tensile strength and elongation at break were determined using a Schopper machine with a jaw separator speed of 40 cm. per minute. The test rings were cut from sheet 4 mm. thick.

(2) Permanent set was determined on samples 10 cm. x 4 mm. x 1 mm. provided with marks 5 cm. apart. The sample is stretched to one half the elongation at break, for 15 minutes, released and rested for 1 hour at 22° C. before measurement.

(3) Hardness and elasticity were tested at laboratory temperature with standard shore instruments using sheets 4 mm. thick.

(4) Resilience was measured on strips of material 8 mm. x 8 mm. x 4 mm. on a pendulum Tripsometer similar to that described by Bernett & Matthews, Ind. Eng. Chem., 1934, 26, 1292. The results are expressed as percentage energy return.

(5) Oil and solvent absorption tests were carried out with Schopper centres 4 mm. thick and 44.7 mm. diameter. Solvent swelling was carried out at laboratory temperature for 2 days and oil swelling at 70° C. for 7 days. Tests have shown that complete saturation is obtained under these conditions.

*Example 8*

477 parts of a 15% aqueous paste of sodium cetyl sulphate, 1578 parts of water and 240 parts of a 7.5% aqueous solution of sulphur dioxide are charged into a vessel as in Example 6, and a mixture of 360 parts of 2-chlorobutadiene-1:3 and 90 parts of methyl α-chloroacrylate added. Polymerisation starts immediately and it is necessary to apply efficient external cooling in order to prevent the temperature from rising above 20° C. After 30 minutes at 20° C. polymerisation is almost complete. The mixture is stirred for several hours, and then isolated as in Example 6. 420 parts of a rubber-like material are obtained.

*Example 9*

The product of Example 8 is compounded to the following formula:

| | Parts |
|---|---|
| Rubber-like material | 100 |
| Wood rosin | 5 |
| Mineral oil | 5 |
| Chlorinated naphthalene | 5 |
| Carbon black | 35 |
| Blanc fixe | 75 |
| Catechol | 0.25 |
| Litharge | 20 |

The mix is cured for 1 hour at 141° C.

Comparison with a 2-chlorobutadiene-1:3 polymer similarly compounded and vulcanised, shows the following properties:

| Test | 2-chlorobutadiene-1:3 polymer | Product of Example 8 |
|---|---|---|
| Shore hardness | 50 | 60 |
| Tensile strength, kg/cm² | 123 | 106 |
| Elongation at break, percent | 678 | 545 |
| Permanent set | 12 | 6 |
| Swelling in water | 5 | 4 |
| Swelling in petrol | 83 | 33 |
| Swelling in mineral oil | 32 | 6 |
| Swelling in Diesel oil | 41 | 14 |

*Example 10*

80 parts of 2-chlorobutadiene-1:3, 20 parts of n-butyl α-chlorotcrylate, B. P. 60–62° C./7 mm. 16 parts of sodium cetyl sulphate and 384 parts of water are treated as in Example 6 for 17 hours, the emulsion being coagulated and the coagulum washed as previously. There are obtained 75 parts of a rubber-like material.

*Example 11*

The rubber-like material of Example 10 is compounded and vulcanised as in Example 7. A vulcanisate is obtained, which has a shore hardess of 66, a tensile strength of 250 kg./cm.², an elongation at break of 820% and which shows, when saturated with Diesel oil at 70° C. a volume increase of only 46%.

*Example 12*

400 parts of water, 4 parts of cetyl p-dimethylaminobenzoate methosulphate, 22 parts of 6% acetic acid, 5 parts of carbon tetrachloride, 30 parts of β-ethoxyethyl α-chloroacrylate, B. P. 78° C./6 mm. and 45 parts of butadiene-1:3 are subjected to the same polymerisation conditions as those of Example 1, and the resulting latex also treated as in Example 1. A good rubber-like product is obtained.

*Example 13*

400 parts of water, 4 parts of cetyl p-dimethylaminobenzoate methosulphate, 22 parts of 6% acetic acid, 10 parts of carbon tetrachloride, 50 parts of n-butyl α-chloroacrylate and 100 parts of butadiene-1:3 are subjected to the same polymerisation conditions as those of Example 1, and the latex also treated as in Example 1. A 64% yield of a rubber-like material is obtained.

*Example 14*

400 parts of water, 4 parts of cetyl p-dimethylaminobenzoate methosulphate, 22 parts of 6% acetic acid, 5 parts of carbon tetrachloride, 30 parts of n-propyl α-chloroacrylate, B. P. 56–60° C./15 mm. and 45 parts of butadiene-1:3 are subjected to the same polymerisation conditions as those of Example 1 and the latex also treated as in Example 1. A 72.5% yield of a rubber-like material is obtained containing 8.35% of chlorine. This rubber-like material after compounding and vulcanising as in Example 4 gives a good resilient vulcanisate.

*Example 15*

As Example 14, except that ethyl α-chloroacrylate is used instead of propyl α-chloroacrylate, B. P. 45–48° C./23 mm. A similar product is obtained.

*Example 16*

104 parts of butadiene-1:3, 22.5 parts of acrylonitrile, 22.5 parts of methyl α-chloroacrylate, 10 parts of carbon tetrachloride, 400 parts of water, 4 parts of cetyl p-dimethylaminobenzoate methosulphate and 22 parts of 6% acetic acid are treated as in Example 1. After washing and drying the resulting coagulated polymer, 130 parts (83% yield) of a rubber-like material are obtained.

Example 17

The product of Example 16 is compounded and vulcanised as in Example 4. The resulting vulcanisate shows when saturated with Diesel oil at 70° C. a volume increase of only 30%.

Example 18

400 parts of water, 4 parts of cetyl p-dimethylaminobenzoate methosulphate, 22 parts of 6% acetic acid, 5 parts of carbon tetrachloride, 30 parts of β-chloroethyl α-chloroacrylate, B. P. 78° C./6 mm. and 48.5 parts of butadiene-1:3 are subjected to the same polymerisation conditions as those of Example 1, a good resilient rubber-like product is obtained.

Example 19

400 parts of water, 4 parts of cetyl p-dimethylaminobenzoate methosulphate, 22 parts of 6% acetic acid, 5 parts of carbon tetrachloride, 25 parts of benzyl α-chloroacrylate and 50 parts of butadiene-1:3 are enclosed in a stainless steel autoclave and treated as in Example 1. 61 parts of a rubber-like material are obtained.

Example 20

800 parts of water, 16 parts of cetyl p-dimethylaminobenzoate methosulphate, 44 parts of 6% acetic acid, 30 parts of tricresyl phosphate, 1.5 parts of benzoyl peroxide, 225 parts of methyl αchloroacrylate and 75 parts of butadiene-1:3 are enclosed in a stainless steel autoclave and agitated at about 60° C. for several days. The resulting latex is coagulated by adding ethyl alcohol, the coagulum washed with water and dried. The resulting mass when run between rubber rolls knits together to form a tough flexible slightly elastic sheet.

Example 21

50 parts of butadiene-1:3, 50 parts of methyl α-chloroacrylate and 0.4 part of benzoyl peroxide are heated in a closed vessel for 4 days at 60° C. 56 parts of a fairly soft rubber-like mass are thus obtained. The interpolymer contains 60% of methyl α-chloroacrylate.

Example 22

The rubber-like material of Example 21 is compounded and vulcanised in the manner described in Example 4. A vulcanisate is obtained which has a tensile strength of 160 kg./cm.$^2$ and an elongation at break of 165%. The product is particularly resistant to the swelling action of oils and solvents. When saturated with Diesel oil at 70° C. a volume increase of only 6% is obtained.

Example 23

50 parts of butadiene-1:3, 25 parts of acrylonitrile, 25 parts of methyl α-chloroacrylate and 0.4 part of benzoyl peroxide are subjected to the polymerising conditions of Example 21. 74 parts of a tough rubber-like product are obtained. This polymer contains 24% of methyl α-chloroacrylate and 22% of acrylonitrile. On compounding and vulcanising, a vulcanisate is obtained with properties similar to that of Example 22.

As many apparently widely different embodiments of this invention may be made without departing from the spirit and scope thereof, it is to be understood that the invention is not limited to the specific embodiments thereof except as defined in the appended claims.

We claim:

1. Process for the manufacture of synthetic, rubber-like materials which comprises polymerizing a mixture of a saponifiable derivative of alpha-chloroacrylic acid and a member of the group consisting of butadiene-1,3, methyl derivatives of butadiene-1,3, dimethyl derivatives of butadiene-1,3, 2-chlorobutadiene-1,3, methyl derivatives of 2-chlorobutadiene-1,3, and dimethyl derivatives of 2-chlorobutadiene-1,3.

2. Process for the manufacture of synthetic, rubber-like materials which comprises polymerizing, in emulsion, a saponifiable derivative of alpha-chloroacrylic acid and a member of the group consisting of butadiene-1,3, methyl derivatives of butadiene-1,3, dimethyl derivatives of butadiene-1,3, 2-chlorobutadiene-1,3, methyl derivatives of 2-chlorobutadiene-1,3, and dimethyl derivatives of 2-chlorobutadiene-1,3.

3. A synthetic, rubber-like material obtained by polymerizing a mixture of a saponifiable derivative of alpha-chloroacrylic acid and a member of the group consisting of butadiene-1,3, methyl derivatives of butadiene-1,3, dimethyl derivatives of butadiene-1,3, 2-chlorobutadiene-1,3, and methyl derivatives of 2-chlorobutadiene-1,3, and dimethyl derivatives of 2-chlorobutadiene-1,3.

4. A synthetic, rubber-like material obtained by polymerizing a mixture of a saponifiable derivative of alpha-chloroacrylic acid and 2-chlorobutadiene-1,3.

5. A synthetic, rubber-like material obtained by polymerizing a mixture of a saponifiable derivative of alpha-chloroacrylic acid and butadiene-1,3.

6. A synthetic, rubber-like material obtained by polymerizing a mixture of methyl-alpha-chloroacrylate and a member of the group consisting of butadiene-1,3, methyl derivatives of the butadiene-1,3, dimethyl derivatives of butadiene-1,3, 2-chlorobutadiene-1,3, methyl derivatives of 2-chlorobutadiene-1,3, and dimethyl derivatives of 2-chlorobutadiene-1,3.

7. A synthetic, rubber-like material obtained by polymerizing a mixture of methyl-alpha-chloroacrylate and 2-chlorobutadiene-1,3.

8. A synthetic, rubber-like material obtained by polymerizing a mixture of methyl-alpha-chloroacrylate and butadiene-1,3.

9. Process which comprises compounding and vulcanizing synthetic, rubber-like materials obtained by the process of claim 1.

10. Vulcanized, compounded, synthetic, rubber-like materials obtained by compounding and vulcanizing the synthetic, rubber-like materials obtained by the process of claim 1.

JAMES GORDON ANDERSON.
ROWLAND HILL.
LESLIE BUDWORTH MORGAN.

CERTIFICATE OF CORRECTION.

Patent No. 2,385,182.                                                    September 18, 1945.

JAMES GORDON ANDERSON, ET AL.

It is hereby certified that error appears in the printed specification of the above numbered patent requiring correction as follows: Page 3, second column, line 15, for "chlorotcrylate" read --chloroacrylate--; page 4, second column, line 66, after the words and period "of claim 1." insert the following claims -

--11. A synthetic rubber-like material obtained by polymerizing a mixture of methyl alpha chloroacrylate with a larger proportion of 2-chlorobutadiene-1,3.

12. A synthetic rubber-like material obtained by polymerizing a mixture of methyl alpha chloroacrylate with 2-chlorobutadiene-1,3, the proportion of the former to the latter in the mixture being 1 to 4.

13. A synthetic rubber-like material obtained by polymerizing a mixture of methyl alpha chloroacrylate with a larger portion of butadiene.

14. A synthetic rubber-like material obtained by polymerizing a mixture of methyl alpha chloroacrylate with butadiene-1,3, the proportion of the former to the latter in the mixture being 1 to 2. --;

in the heading to the printed specification, line 11, for "10 Claims" read --14 Claims--; and that the said Letters Patent should be read with this correction therein that the same may conform to the record of the case in the Patent Office.

Signed and sealed this 22nd day of January, A. D. 1946.

(Seal)

Leslie Frazer
First Assistant Commissioner of Patents.